United States Patent Office 3,262,837
Patented July 26, 1966

3,262,837
LAMINATED SAFETY GLASS
Edward Lavin, Longmeadow, George E. Mont, Springfield, and Aubrey F. Price, South Hadley, Mass., assignors to Monsanto Company, St. Louis, Mo., a corporation of Delaware
No Drawing. Filed Sept. 21, 1965, Ser. No. 489,054
18 Claims. (Cl. 161—199)

This invention relates to improved laminated safety-glass. More particularly, this invention relates to laminated safety-glass having an interlayer of a plasticized polyvinyl acetal, which has higher resistance to penetration.

Laminated safety-glass comprises two or more glass panels bound with an interlayer of a transparent, adherent plastic. The usual plastic interlayer is a plasticized polyvinyl acetal resin formed in a sheet or film with a thickness of about 0.015 inch or more. The major commercial use of these safety-glass compositions is for automobile windshields, as well as for windshields in other moving vehicles. The ever increasing number of automobiles and the faster speed of travel today coupled with the greater area of modern day windshields has accentuated the need for improved laminated safety-glass. These structures must not only help protect persons in a car from being struck by flying objects from the outside but should prevent occupants from penetrating the windshield on impact after a sudden stop. The danger of being cut by glass in the windshield can occur not only when a body strikes the windshield and penetrates it but also when the windshield is broken and glass fragments are released. The interlayer therefore benefits the structure not only by adhering to the glass particles but also has the added advantage of absorbing energy on impact thereby decreasing the possibility of skull fracture which may occur when a head strikes the windshield, while also supplying added resistance to penetration.

The interlayers in present day commercial windshields usually contain about 0.2 to 0.8% moisture. It has been reported that some increase in resistance to penetration is found if the moisture content of the plastic interlayer is considerably higher. However, the presence of increased moisture alone to improve the penetration resistance sufficiently is impractical because the clarity of the windshield is adversely affected by the formation of bubbles between the interlayer and the glass or within the interlayer. Further, the presence of excess moisture may cause delamination. Consequently, the automotive and laminating industries have not been able to take significant advantage of this method of improving resistance to penetration.

The principal object of this invention is to provide laminated safety-glass having improved safety features.

A further object of this invention is to provide a laminated safety-glass having improved resistance to penetration by impacting objects such as the human head.

A particular object of this invention is to provide improved physical properties in laminated safety-glass.

Another object of this invention is to provide methods and means to accomplish the preceding objects.

These and other objects are accomplished in a laminated safety-glass by bonding two glass panels with an interlayer of a plasticized polyvinyl acetal resin; said interlayer having a moisture content of 0.2 to 0.8% by weight and containing sufficient metal alkyl carboxylates to produce a titer of from 2 to 100, wherein the metal alkyl carboxylate is selected from the group consisting of Groups IIA, IB, IIB, IIIA, IVA, VIIB and VIII of the Periodic Table, and the alkyl carboxylate portion is selected from the group consisting of formate, acetate, propionate and butyrate.

The alkalinity titer is the number of milliliters of 0.01 normal hydrochloric acid required to neutralize 100 grams of the polyvinyl acetal resin. This is an arbitrary standard used to designate the alkalinity of the resin. The alkalinity titer is usually determined prior to plasticization by dissolving 7 grams of the polyvinyl acetal resin in 250 cc. of preneutralized ethyl alcohol and titrating with 0.005 normal hydrochloric acid to the endpoint using bromphenol blue indicator and calculating from the result obtained to determine the milliliters of 0.01 normal acid required for 100 grams resin.

It is customary to stabilize polyvinyl acetals for interlayers with potassium or sodium hydroxide and/or potassium or sodium acetate by adding small amounts of these materials. These are normally added during the preparation of the polyvinyl acetal. However, these materials increase the titer level without improving the penetration resistance or impact strength of the laminate except at objectionably high titer levels. Moreover, large amounts of these salts or bases tend to increase the color of the extruded plasticized resin which is undesirable in an interlayer. The presence of such alkaline materials produces the alkalinity titer in conventional polyvinyl acetal interlayers.

The following examples are given in illustration of the invention and are not intended as limitations thereof. All parts and percentages are by weight unless otherwise specified.

Example I is set forth as a control to illustrate the poorer results obtained when using potassium acetate to control the titer.

EXAMPLE I (a) This example uses a conventional polyvinyl acetal interlayer for safety-glass. It is a polyvinyl butyral containing 18.8% vinyl alcohol by weight and having an alkalinity titer of 20. This titer is due to the presence of potassium acetate (K acetate) in the polyvinyl butyral. The resin is plasticized with 44 parts triethylene glycol di(2-ethyl butyrate) and has a moisture content of about 0.4%. The interlayer is formed into sheets 0.015 inch thick (15 gauge) and 0.030 inch thick (30 gauge). These interlayer sheets are used as controls.

Sets of ten glass laminates are individually prepared by interposing the 15 gauge interlayer between two 24 x 36 x 0.125 inch panels of glass and the 30 gauge interlayer between two 12 x 12 x 0.125 inch panels of glass. The resulting laminates are then subjected to a temperature of about 275° F. at a pressure of 185 p.s.i. for approximately 10 minutes to bond the laminate or panels together.

Further sets of glass laminates are similarly prepared as above using plasticized polyvinyl butyral containing potassium acetate at varying levels producing the following alkalinity titers:

(b) 29
(c) 42

The laminates prepared by the above procedure are then subjected to mean break height tests according to the recently established tentative specifications set up by the Society of Automotive Engineers, the Subcommittee on Automotive Glazing and the results tabulated in Table I.

In essence, the mean break height test comprises placing the laminate in a horizontal position with a frame or edge support and while maintaining a constant laminate temperature, which is 70° F. in this series, allowing a 22-pound spherical ball (referred to as a head form) to drop from the designated height against approximately the middle of the laminate made with the 15 gauge interlayer. This test is repeated at increasing ball-drop heights to determine the approximate height in feet at which 50% of the laminates tested will resist penetration. In other words, the mean break height of a laminate is a measure of the ability of that laminate to absorb the energy of an impacting object. The same test is used with the laminates made with 30 gauge interlayer except that a 5-pound steel ball is used on the smaller laminate.

Results of the mean break height test for the laminates of Examples I are tabulated in Table I. Unless otherwise specified, the values for mean break heights in the discussion refer to those for laminates using 30 gauge interlayers.

Table I
EXAMPLES Ia-Ic

| Example | Salt | Alkalinity Titer, cc. | Mean Break Height (Feet) | | Percent Moisture Content |
|---|---|---|---|---|---|
| | | | 15 Gauge* | 30 Gauge* | |
| (a) | K Acetate | 20 | 2.3 | 7.0 | 0.40 |
| (b) | do | 29 | 2.4 | 7.2 | 0.40 |
| (c) | do | 42 | 2.9 | 8.5 | 0.43 |

*Thickness of interlayer.

Examples II–XIII are set forth to illustrate the superior impact strength of glass laminates prepared from polyvinyl butyral interlayer wherein the titer is due to metal alkyl carboxylates, which are more commonly referred to as salts, whereby the metal portion is not an alkali metal. These examples are prepared and tested according to the procedure of Example I. The data on Examples II–XIII are tabulated in Table II.

Table II
EXAMPLES II-XIII

| Example | Salt | Alkalinity Titer, cc. | Mean Break Height (Feet) | | Percent H₂O |
|---|---|---|---|---|---|
| | | | 15 Gauge | 30 Gauge | |
| II | Cd Acetate | 12 | 2.8 | 12.1 | 0.51 |
| III | do | 25 | 4.1 | 14.8 | 0.49 |
| IV | Zn Acetate | 7 | 2.6 | 11.3 | 0.50 |
| V | do | 21 | 5.1 | 15.8 | 0.47 |
| VI | Pb Acetate | 9 | 2.6 | 11.1 | 0.58 |
| VII | do | 20 | 3.6 | 13.9 | 0.48 |
| VIII | Ca Acetate | 20 | 2.3 | 10.0 | 0.52 |
| IX | do | 40 | 3.2 | 13.1 | 0.53 |
| X | Al Acetate | 3 | 2.2 | 10.1 | 0.58 |
| XI | do | 15 | 2.7 | 11.6 | 0.56 |
| XII | {Mg Acetate (11 titer), Zn Acetate (9 titer)} | 20 | 2.5 | 10.6 | 0.35 |
| XIII | Cu Acetate | 5 | 2.4 | 10.2 | 0.53 |

The control samples show results obtained using potassium acetate alone at titers from 20 to 42. The metal alkyl carboxylates used in the practice of this invention show mean break heights that are significantly better than those obtained with potassium acetate at titers of from 3 to 40.

A comparison of Examples I(a)–I(c) with Examples II–XIII show that the impact resistance is nearly doubled when using metal alkyl carboxylates wherein the metal portion is something other than alkali metal.

Example I(a) has a potassium acetate titer of 20 and a mean break height of 7.0 ft. while Example V, using zinc acetate at a titer level of 21 has a mean break height of 15.8 feet. Comparably good results are obtained using the other metal alkyl carboxylates listed in Table II in accordance with the practice of this invention.

Example X using aluminum acetate at a titer level of 3 illustrates that good impact strength may be obtained at very lower titer levels. Inded, it is impossible to obtain such impact strength at this low titer level when using conventional potassium acetate.

Example XII is included to demonstrate that combinations of the specified metal alkyl carboxylates are equally useful in controlling the titer of the interlayer and improving the impact strength of glass laminates.

The metal alkyl carboxylates or salts suitable for the practice of this invention are metal formates, acetates, propionates and butyrates wherein the metal portion is selected from Groups IIA, IB, IIB, IIIA, IVA, VIIB and VIII of the Periodic Table as set forth at pages 56–67 in Lange's Handbook of Chemistry, 9th edition. Especially preferred for use as the metal portion are aluminum, magnesium, calcium, copper, zinc, cadmium, lead, cobalt and nickel, while acetate is the preferred alkyl carboxylate.

Preferably one would use the acetate salts of the above metals, with the exception of lead acetate, at titers of from 2–100. Lead acetate tends to cause haze in the laminate at titers in excess of 20 and consequently should be used at titers below that level.

Other salts such as chromium acetate, were tried at various titer levels with no apparent increase in impact strength.

The laminated safety-glass of this invention is especially efficient in that the improved resistance to penetration is balanced over a wide temperature range. The impact tests shown in the examples are conducted at room temperature, however, tests conducted at as low a 4° F. and as high as 120° F. indicate that these laminates exhibit improved properties over a wide temperature range.

It is well known that an increase in the thickness of the plasticized polyvinyl butyral interlayer will give some improvement to the penetration resistance of the laminates. This invention is equally applicable to the thicker laminates. In fact the use of an 0.030 inch interlayer containing the metal alkyl carboxylates of this invention results in mean break heights more than double those of the 0.015 inch interlayers of the examples. One of the prime goals of the safety councils for safer motor vehicles is to prevent windshield penetration by any part of the human body upon collision at today's rates of speed. As a result of this invention, windshield laminates can be prepared which from test results indicate that the laminates would not be penetrated on collision impacts even where the automobile was travelling at speeds in excess of 25 m.p.h. In other words, at normal interlayer moisture contents, if the alkalinity level is controlled in accordance with the practice of this invention, a far superior safety laminate will result.

As earlier noted, the moisture content of the polyvinyl butyral interlayer cannot be increased too greatly if bubble problems are to be avoided. In addition, the moisture content of the interlayer is rather difficult to control since it can be affected by atmospheric conditions and the particular laminating process. Consequently, it is critical that the moisture content be maintained rather low, i.e., 0.2 to 0.8%. On the other hand, the alkalinity titer of the polyvinyl butyral interlayer can be readily increased by the addition of these metal alkyl carboxylates during the preparation of the polyvinyl butyral resin. The minimum quantity of metal alkyl carboxylate necessary to effect a particular improvement in penetration resistance of the final laminate has been found to be inversely proportional in some degree to the preferred moisture content, i.e., greater impact strength is achieved at the upper end of the 0.2 to 0.8% moisture range.

Table III illustrates the small effect of moisture within the normal moisture range in the absence of any salts on the impact strength of various sets of glass laminates. The plasticized interlayer sheets having an alkalinity titer of zero are prepared from a resin thoroughly washed after swelling in alcohol-water as described below.

Table III
EFFECT OF MOISTURE ON MEAN BREAK HEIGHT

| Alkalinity Titer | Percent Moisture Content | Mean Break Height (Feet) | |
|---|---|---|---|
| | | 15 Gauge Interlayer | 30 Gauge Interlayer |
| 0 | .06 | 2.3 | 7.5 |
| 0 | .31 | 2.4 | 7.7 |
| 0 | .37 | 2.4 | 7.8 |
| 0 | .50 | 2.8 | 8.0 |
| 0 | .75 | 3.0 | 8.3 |

Taken alone, the presence of from 0.1 to 0.8% water in the interlayer has little effect on the mean break height. However, this effect is increased in the presence of the salts of this invention. The result is that laminates containing metal alkyl carboxylate, wherein the metal is preferably aluminum, cadmium, calcium, copper, lead, magnesium or zinc and having a moisture content in the upper end of the 0.2 to 0.8% range would have somewhat better impact resistance than those in the lower end of the moisture range.

In order to avoid alkali burns on processing of the resin during plasticization or extrusion and to avoid excessive sensitivity to moisture in the interlayers which may result in edge separation of the laminates it is highly preferred to limit the alkalinity titer so that it is not over 100. For the above reasons, it is a preferred embodiment of this invention to limit the alkalinity titer to a maximum of 100 within the range of 0.2 to 0.8% moisture content. The lower limit of effectiveness of the alkalinity titer for improved impact strength is about 2. Within a moisture content of 0.2 to 0.8%, a most preferred range of alkalinity titer is 2 to 60.

In general, the laminates are prepared by interposing the plasticized polyvinyl butyral interlayer between a pair of glass plates and then subjecting the resulting assembly to a temperature of 190 to 325° F. and a pressure of 150 to 225 p.s.i. for at least 10 minutes to bond the assembly together.

The polyvinyl acetal resins which are employed in the present invention may be made from various unsubstituted ketones containing an active carbonyl group or from mixtures of unsubstituted aldehydes and ketones. Thus, formaldehyde, acetaldehyde, propionaldehyde, butyraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester wherein the carboxylic moiety is derived from an aliphatic acid of from 1 to 8 carbon atoms such as formate, acetate, propionate, butyrate, 2-ethylhexylate, etc. in the presence of a solvent for the product and precipitating the resin product with water. Alternate methods might include carrying out the reaction in presence of a non-solvent dispersing medium such as water or a non-solvent mixture of water and solvent, e.g., a water-ethanol mixture. More detailed methods for preparing such resins are set forth in Morrison et al. U.S. Patent No. Re. 20,430, dated June 29, 1937, and Lavin et al. U.S. Patent No. 2,496,480. In general, polyvinyl acetal resins made from saturated lower unsubstituted aliphatic aldehydes are most suitable. These would include polyvinyl acetal resins made from unsubstituted saturated aliphatic aldehydes containing less than 6 carbon atoms such as propionaldehyde, valeraldehyde and especially those made from formaldehyde, acetaldehyde, butyraldehyde and mixtures thereof. Particularly preferred are polyvinyl acetal resins made from butyraldehyde.

In general, the polyvinyl acetal resins employed have Staudinger molecular weights ranging from about 50,000 to 600,000 and preferably from 150,000 to 270,000 and may be considered to be made up, on a weight basis, of from 5 to 25% hydroxyl groups, calculated as polyvinyl alcohol, 0 to 40% ester and preferably acetate groups calculated as polyvinyl ester, e.g., acetate, and the balance substantially acetal. When the acetal is butyraldehyde acetal, the polyvinyl acetal resin will preferably contain, on a weight basis, from 9 to 30% hydroxyl groups, calculated as polyvinyl alcohol and from 0 to 3% ester, e.g., acetate, groups, calculated as polyvinyl ester, the balance being substantially butyraldehyde acetal.

The resin prepared according to the above methods will contain approximately 10–40 cc. alkalinity titer which is generally composed of potassium acetate or sodium acetate depending on the process used. In order to replace these salts with the metal alkyl carboxylates of this invention, the resin is swelled in a mixture of alcohol-water (0.960 sp. gr.) at about 40° C. for about 1 hour and then washed thoroughly with water until the dried resin is neutral to brom-phenol blue in the alkalinity titer test. Appropriate amounts of the metal alkyl carboxylates of this invention are then added to a slurry of the washed zero alkalinity titer resin (5 parts water per part of resin). After thirty minutes the grains are filtered and dried. Uniform distribution of the salts is further effected by the plasticization step.

An alternative method of adding the salts to a zero titer resin is by adding it with the plasticizer during the plasticization step.

The resin produced may be plasticized to the extent of about 20 to 80 parts plasticizer per 100 parts resin and more commonly between 40 and 50 parts for normal windshield use. This latter concentration is generally used with polyvinyl butyrals containing 18 to 23% vinyl alcohol by weight. In general, the plasticizers which are commonly employed are esters of a poly-basic acid or a polyhydric alcohol. Particularly suitable are triethylene glycol di(2-ethyl butyrate), dibutyl sebacate and di(beta-butoxyethyl)adipate. The resulting plasticized resin mixture is then generally extruded in the form of sheets and cut to size to produce the interlayers used in the present invention. The plasticized polyvinyl butyral resin interlayer is self-adhesive in nature thereby eliminating the need for a separate adhesive to bond the glass laminate together.

Safety-glass laminates find special application in the automotive and aircraft industries for protecting passengers both against the hazards of flying objects and to reduce injury caused by bodily impact against the laminate. Wherever else glass or transparent panels are utilized such as in the building trade, the protection afforded by safety-glass has become increasingly important. The laminates of the present invention increase the advantages of utilizing safety-glass because of their improved safety performance.

It is obvious that many variations may be made in the products and processes set forth above without departing from the spirit and scope of this invention.

What is claimed:

1. An improved interlayer for laminated safety-glass comprising a polyvinyl acetal resin; said interlayer having a moisture content of 0.2 to 0.8% and containing sufficient metal alkyl carboxylates to produce a titer of from 2 to 100, wherein the metal portion of the metal alkyl carboxylate is selected from the group consisting of Groups IIA, IB, IIB, IIIA, IVA, VIIB and VIII of the Periodic Table, and the alkyl carboxylate portion is selected from the group consisting of formate, acetate, propionate and butyrate.

2. An improved interlayer as in claim 1 wherein the polyvinyl acetal is polyvinyl butyral.

3. The improved interlayer of claim 2 wherein the polyvinyl butyral has a vinyl alcohol content of 9 to 30% by weight and is plasticized with from 20 to 50 parts plasticizer per 100 parts polyvinyl butyral.

4. The improved interlayer of claim 2 wherein the metal acetate is aluminum acetate.

5. The improved interlayer of claim 2 wherein the metal acetate is cadmium acetate.

6. The improved interlayer of claim 2 wherein the metal acetate is calcium acetate.

7. The improved interlayer of claim 2 wherein the metal acetate is lead acetate.

8. The improved interlayer of claim 2 wherein the metal acetate is zinc acetate.

9. The improved interlayer of claim 2 wherein the metal acetate is a mixture of magnesium acetate and zinc acetate.

10. An improved laminated safety-glass comprising two layers of glass bonded to a plasticized polyvinyl acetal interlayer; said interlayer having a moisture content of 0.2 to 0.8% and containing sufficient metal alkyl carboxylates to produce a titer of from 2 to 100, wherein the metal portion of the metal alkyl carboxylate is selected from the group consisting of Groups IIA, IB, IIB, IIIA, IVA, VIIB and VIII of the Periodic Table and the alkyl carboxylate portion is selected from the group consisting of formate, acetate, propionate, and butyrate.

11. An improved laminated safety-glass as in claim 10 wherein the polyvinyl acetal is polyvinyl butyral.

12. The improved laminated safety-glass of claim 11 wherein the polyvinyl butyral has a vinyl alcohol content of 9 to 30% by weight and is plasticized with from 20 to 50 parts plasticizer per 100 parts polyvinyl butyral.

13. The improved laminated safety-glass of claim 11 wherein the metal acetate is aluminum acetate.

14. The improved laminated safety-glass of claim 11 wherein the metal acetate is cadmium acetate.

15. The improved laminated safety-glass of claim 11 wherein the metal acetate is calcium acetate.

16. The improved laminated safety-glass of claim 11 wherein the metal acetate is a mixture of lead acetate and zinc acetate.

17. The improved laminated safety-glass of claim 11 wherein the metal acetate is a mixture of magnesium acetate and zinc acetate.

18. The method of preparing an improved plasticized polyvinyl acetal interlayer which comprises swelling a polyvinyl acetal resin in a mixture of alcohol and water at about 40° C. for about 1 hour and washing with water until the resin has a zero alkalinity titer, then adding to an aqueous slurry on the resin sufficient metal alkyl carboxylate to produce a titer of from 2 to 100 wherein the metal portion of the metal alkyl carboxylate is selected from the group consisting of Groups IIA, IB, IIB, IIIA, IVA, VIIB and VIII of the Periodic Table, and the alkyl carboxylate portion is selected from the group consisting of formate, acetate, propionate and butyrate, adjusting the moisture content of the polyvinyl acetal to 0.2 to 0.8% by weight, plasticizing the polyvinyl acetal, and forming the interlayer.

References Cited by the Examiner

UNITED STATES PATENTS

| | | | |
|---|---|---|---|
| 2,456,462 | 12/1948 | Stamatoff | 260—73 |
| 2,496,480 | 2/1950 | Lavin et al. | 260—73 |
| 2,720,501 | 10/1955 | Van Ness | 260—73 |
| 2,859,207 | 11/1958 | Dahle | 260—73 |
| 2,860,122 | 11/1958 | Berardinelli et al. | 260—73 |
| 2,946,711 | 7/1960 | Bragaw et al. | 161—199 |

ALEXANDER WYMAN, *Primary Examiner.*

W. J. VAN BALEN, *Assistant Examiner.*